(12) United States Patent
Perut et al.

(10) Patent No.: US 7,964,111 B2
(45) Date of Patent: Jun. 21, 2011

(54) SOLID HYDROGEN SOURCE COMPOUNDS AND METHOD FOR GENERATING HYDROGEN

(75) Inventors: Christian Perut, Saint-Fargeau-Ponthierry (FR); Joël Renouard, Saint-Martin-En-Biere (FR)

(73) Assignee: SNPE Materiaux Energetiques, Paris (FR)

( * ) Notice: Subject to any disclaimer, the term of this patent is extended or adjusted under 35 U.S.C. 154(b) by 220 days.

(21) Appl. No.: 12/217,865

(22) Filed: Jul. 9, 2008

(65) Prior Publication Data
US 2009/0057609 A1    Mar. 5, 2009

(30) Foreign Application Priority Data

Jul. 13, 2007 (FR) .................................. 07 56482

(51) Int. Cl.
C02F 1/70 (2006.01)
C01B 17/66 (2006.01)
C06B 43/00 (2006.01)
C10L 11/00 (2006.01)

(52) U.S. Cl. ......... 252/188.23; 252/188.25; 252/188.26; 252/188.2; 44/532; 44/500; 44/530; 44/604; 149/22; 149/27; 149/109.2

(58) Field of Classification Search ............. 252/188.25, 252/188.26; 44/314, 321, 304, 280, 265, 44/250, 500, 532, 604, 628, 641; 149/22, 149/27, 28, 37, 61, 46, 76, 82, 17, 20, 21
See application file for complete search history.

(56) References Cited

U.S. PATENT DOCUMENTS

| | | | | |
|---|---|---|---|---|
| 2,963,356 A * | 12/1960 | Guth | ........................... | 149/19.9 |
| 2,996,877 A * | 8/1961 | McMillan et al. | .............. | 60/215 |
| 3,158,993 A | 12/1964 | Hodgson | | |
| 3,203,171 A * | 8/1965 | Burke, Jr. et al. | ................ | 60/211 |
| 3,377,955 A * | 4/1968 | Hodgson | ....................... | 102/289 |
| 3,577,289 A * | 5/1971 | Morrell | ........................... | 149/18 |
| 3,666,672 A * | 5/1972 | Hiltz | ................................ | 149/22 |
| 4,061,512 A * | 12/1977 | Chew et al. | ...................... | 149/22 |
| 4,448,619 A * | 5/1984 | Mitchell | ........................... | 149/21 |
| 4,673,528 A * | 6/1987 | Artz et al. | ................ | 252/188.25 |
| 4,722,757 A * | 2/1988 | Cooper et al. | .................... | 149/2 |
| 5,401,340 A * | 3/1995 | Doll et al. | ........................ | 149/22 |
| 5,507,889 A * | 4/1996 | Mullay et al. | ..................... | 149/2 |
| 5,673,935 A | 10/1997 | Hinshaw et al. | | |
| 5,756,929 A * | 5/1998 | Lundstrom et al. | ............. | 149/22 |
| 6,165,297 A * | 12/2000 | Smith et al. | ................. | 149/109.6 |
| 2003/0051785 A1* | 3/2003 | Gauthier et al. | ................ | 149/22 |
| 2004/0065395 A1* | 4/2004 | Desgardin et al. | ............. | 149/22 |
| 2004/0065865 A1* | 4/2004 | Desgardin et al. | ........ | 252/188.25 |
| 2004/0237384 A1* | 12/2004 | Orr | ................................. | 44/314 |
| 2005/0044778 A1* | 3/2005 | Orr | ................................. | 44/320 |
| 2006/0090394 A1* | 5/2006 | Torgersen et al. | .............. | 44/628 |
| 2008/0271377 A1* | 11/2008 | Zhou | ........................ | 48/197 FM |

FOREIGN PATENT DOCUMENTS

| | | |
|---|---|---|
| EP | 1 249 427 A | 10/2002 |
| EP | 1 405 823 A | 4/2004 |
| EP | 1 405 824 A | 4/2004 |
| EP | 1 496 035 A2 | 1/2005 |
| FR | 2 823 203 A | 10/2002 |
| FR | 2 845 376 A | 4/2004 |
| FR | 2 845 377 A | 4/2004 |
| FR | 2 857 358 A | 1/2005 |

OTHER PUBLICATIONS

Goo, N.H. et al. "Synthesis of the nanocrystalline MgS and its interaction with hydrogen", Journal of Alloys and Compounds, vol. 404-406, Dec. 8, 2005, pp. 503-506.

* cited by examiner

Primary Examiner — Milton I Cano
Assistant Examiner — Jane L Stanley
(74) Attorney, Agent, or Firm — Hamre, Schumann, Mueller & Larson, P.C.

(57) ABSTRACT

The present invention relates to solid compounds which generate hydrogen by combustion, and to a method for generating hydrogen based on the combustion of said compounds. Said compounds have a composition which includes at least one inorganic borohydride, selected from alkali borohydrides, alkaline-earth borohydrides and mixtures thereof, and at least one inorganic oxidant. Characteristically, said composition comprises sulfur. Said method is advantageously implemented for supplying hydrogen to a fuel cell.

21 Claims, No Drawings

SOLID HYDROGEN SOURCE COMPOUNDS AND METHOD FOR GENERATING HYDROGEN

The present invention relates to solid compounds (materials or products) which generate hydrogen by combustion, and to a method for generating hydrogen based on the combustion of said compounds.

The present invention belongs to the field of the production of hydrogen, a gas widely used as a fuel or reducing agent in numerous industrial processes and devices. It primarily relates to novel solid compounds, decomposable to generate hydrogen, by a self-sustaining combustion reaction. It also relates to the use of these novel compounds for generating hydrogen, particularly in the context of supplying hydrogen to fuel cells with a proton exchange membrane.

A person skilled in the art, who wishes in particular to replace the batteries of portable electronic systems, such as telephones and computers, has the permanent concern of seeking novel compounds which generate hydrogen by combustion, and which, as closely as possible, meet the following specifications:

- perfect stability over time,
- ability to burn at a sufficiently high temperature for the combustion reaction to be self-sustaining and therefore uninterrupted (the compounds must be completely consumable in one step), while generating gases (therefore including hydrogen) which have an acceptable temperature in the context of their use,
- a good mass hydrogen yield, and
- during the combustion, generate the least possible amount of harmful (reactive and/or toxic) species.

The Applicant has already proposed compounds of this type: solid compounds which decompose to generate hydrogen by a self-sustaining combustion reaction, after the combustion is initiated by an appropriate heat source. The Applicant has more particularly described such compounds in patent applications FR 2 823 203, FR 2 845 376, FR 2 845 377 and FR 2 857 358. In their composition, these compounds comprise an inorganic borohydride and an inorganic oxidant. In the context of the present invention, and throughout the present description, the adjective inorganic means carbon-free.

The Applicant has in particular tested such compounds, containing:

- on the one hand, an alkali borohydride, such as $NaBH_4$ or $LiBH_4$ or an alkaline-earth borohydride, such as $Mg(BH_4)_2$; and
- on the other hand, an inorganic oxidant, such as ammonium perchlorate ($NH_4ClO_4$), strontium nitrate ($Sr(NO_3)_2$), ammonium nitrate ($NH_4NO_3$) and ammonium dinitramine ($NH_4N(NO_2)_2$).

The Applicant has demonstrated that the combustion of such compounds generates hydrogen with a mass yield of up to 12%. This unexpected result constitutes a particularly important technical and economic advance. Obviously, the results vary with the type and the relative proportions of the components of the compounds.

The compounds concerned advantageously consist essentially of an inorganic borohydride and an inorganic oxidant; that is these components are predominant by weight. They very advantageously consist of more than 75% by weight (or even more than 95% by weight) of these components.

In particular contexts, and particularly in relation to fuel cells, some points of the abovementioned specification are crucial.

The products reaching the fuel cell must be free, or have extremely low contents, of species liable to poison the catalyst of the cells: this is particularly true of CO, $NH_3$, $Cl_2$ and $H_2S$.

The temperature of the gases in the cell must be limited to about 350K to avoid damaging the membrane, and the particle content must be very low.

The hydrogen generating compounds must therefore be optimized to generate the least possible gaseous species that are poisonous for the cell and to burn at a moderate temperature. Filtration and cooling devices may be adapted to the gas generator incorporating the compound, in order to further lower the gas temperature, and to capture the residual poisoning gas species.

In the past, the Applicant has particularly focused on the technical problem of generating hydrogen pyrotechnically, producing the least possible gas species that are poisons for the fuel cell. Table 1 below shows examples of thermodynamic calculations of the combustion of prior art compounds mentioned above (the composition of said compounds indicated is a weight composition).

The last part of Table 1 only lists the solid, liquid or gaseous species formed in a weight content of 1% or more.

TABLE 1

| | Borohydride | | | | |
|---|---|---|---|---|---|
| | $NaBH_4$ (60%) | $LiBH_4$ (60%) | $NaBH_4$ (60%) | $NaBH_4$ (70%) | $Mg(BH_4)_2$ (70%) |
| | | | Oxidant | | |
| Products | $Sr(NO_3)_2$ (40%) | $Sr(NO_3)_2$ (40%) | $NH_4ClO_4$ (40%) | $NH_4N(NO_2)_2$ (30%) | $Sr(NO_3)_2$ (30%) |
| | | | Tc (K) | | |
| formed | 820 | 743 | 1183 | 950 | 1071 |
| $H_2$ (g) | 6.4 | 10.2 | 7.8 | 8.4 | 10.4 |
| B (s) | 6.3 | 25.7 | 6.1 | 3.4 | 24.5 |
| BN (s) | 9.4 | 9.4 | 8.4 | 24.0 | 7.0 |
| $B_2O_3$ (l) | 21.7 | | | 11.2 | |
| LiH (s) | | 6.9 | | | |
| $Li_2O$ (s) | | 28.2 | | | |
| Mg (g) | | | | | 1.4 |
| Mg (g) | | | | | 8.7 |
| MgO (s) | | | | | 29.15 |
| $N_2$ (g) | | | | | |

TABLE 1-continued

| | Borohydride | | | | |
|---|---|---|---|---|---|
| | $NaBH_4$ (60%) | $LiBH_4$ (60%) | $NaBH_4$ (60%) | $NaBH_4$ (70%) | $Mg(BH_4)_2$ (70%) |
| | Oxidant | | | | |
| | $Sr(NO_3)_2$ (40%) | $Sr(NO_3)_2$ (40%) | $NH_4ClO_4$ (40%) | $NH_4N(NO_2)_2$ (30%) | $Sr(NO_3)_2$ (30%) |
| Products | Tc (K) | | | | |
| formed | 820 | 743 | 1183 | 950 | 1071 |
| Na (l) | 35.3 | | | 23.7 | |
| $Na_2$ (g) | | | | 2.8 | |
| Na (g) | | | 12.4 | 10.5 | |
| SrO (s) | 19.6 | 19.6 | | | 13.2 |
| NaCl (s) | | | 18.6 | | |
| $NaBO_2$ (g) | | | 44.7 | 15.9 | |

(s): solid state,
(l): liquid state,
(g): gas state

The prior art compositions in Table 1 clearly meet the requirements set by the Applicant, but they have the drawback of generating highly reactive species that are liable to constitute a hazard for the user.

Sodium (from $NaBH_4$) is found in liquid form or partially in liquid form and partially in gas form.

Lithium (from $LiBH_4$) is found in oxide form ($Li_2O$) and hydride form (LiH).

Most of the magnesium (from $Mg(BH_4)_2$) is found in the form of magnesium oxide (MgO), which is harmless to the environment, and, in smaller proportions, in the form of liquid and gaseous magnesium.

It is known that Na and LiH, and to a lesser degree Mg, are highly reactive substances, particularly with water, requiring special vigilance. Their presence is undesirable in the combustion waste. It may be tolerated for applications involving a small quantity of hydrogen generator product. On the contrary, it is problematic for higher electrical capacity applications, which may generate up to several kilograms of combustion waste.

The generation of these undesirable, because highly reactive, species, is therefore a genuine technical problem. This technical problem is particularly serious because conventional methods for capturing these species, for example Na, Li or Mg, are unfeasible in the particular context of hydrogen generation by combustion of the compounds concerned. Thus for example, increasing the ammonium perchlorate content in order to capture all the sodium or the lithium to form NaCl or LiCl is unfeasible, because this raises the combustion temperature above acceptable values, while lowering the hydrogen content below the advantageous level. Similarly, the incorporation of organic compounds to form Na and Li carbonates is also unfeasible because, at low combustion temperature, CO, which is a poison for the fuel cell, is systematically formed.

In such a context, the Applicant proposes novel solid compounds, suitable for generating hydrogen, particularly advantageous in that their combustion generates very little or no reactive and/or toxic waste. The technical problem discussed above has been addressed, upstream, in the composition of said compounds.

The researches conducted by the Applicant have enabled him to find an oxidant, substituting completely or only partly for the inorganic oxidant of the prior art, and which is suitable for decreasing, or even avoiding, the production of reactive waste (particularly metal waste), while preserving, for the compounds containing said oxidant, the properties required for their application, in particular to fuel cells (so reduced production of cell poisoning species, and also "adequate" combustion temperature and high hydrogen yield). The oxidant concerned is sulfur.

According to its primary object, the present invention therefore relates to solid compounds (materials or products), suitable for generating hydrogen by combustion (that is which decompose to generate hydrogen by a self-sustaining combustion reaction), compounds whereof the composition includes at least one inorganic borohydride, selected from alkali borohydrides, alkaline-earth borohydrides and mixtures thereof, and at least one inorganic oxidant. Characteristically, the composition of said compounds comprises sulfur.

The sulfur present in said composition of the compounds of the invention is intended to capture the decomposition elements of said at least one inorganic borohydride, to form unreactive, nontoxic solid species, such as $Na_2S$, $Li_2S$, MgS (instead of the reactive species mentioned above: Na, LiH and Mg).

Compared to the compounds of the prior art containing a hydrogenated inorganic oxidant (such as an ammonium salt or a dinitramine), the compounds of the invention, with sulfur totally or partially replacing said oxidant, produce slightly less hydrogen.

Compared to the compounds of the prior art containing a hydrogen-free inorganic oxidant (such as strontium nitrate), the compounds of the invention, with sulfur completely or partially replacing said oxidant, produce as much hydrogen.

The presence of sulfur in the composition of the solid compounds of the invention (solid compounds suitable for generating hydrogen by combustion, particularly to supply hydrogen to a fuel cell) is original today. It has unexpectedly proved to be particularly timely. Sulfur is in fact capable of largely, or even completely neutralizing alkalis (Na, Li) and alkaline-earth metals (Mg), while minimizing, or even avoiding, the formation of $H_2S$ (poison for a fuel cell). In the context of supplying hydrogen for fuel cells, the formation of $H_2S$ was a certain danger; it was the justification of a real prejudice against the incorporation of sulfur in the composition of hydrogen generating compounds for fuel cells. It is the Applicant's merit to have overcome this prejudice by demonstrating the advantage of the compounds of the present invention.

The compounds of the invention are in fact capable of existing in two alternatives.

According to a first alternative, their composition includes:
at least one inorganic borohydride, selected from alkali borohydrides, alkaline-earth borohydrides and mixtures thereof (generally one such inorganic borohydride);
at least one inorganic oxidant (generally one such inorganic oxidant); and
sulfur.

In the context of this first alternative, it can be considered that sulfur substitutes partially for the conventional oxidizing charge of similar compounds of the prior art.

According to a second alternative, the composition of the compounds of the invention, including at least one inorganic borohydride and at least one inorganic oxidant, actually includes sulfur as the sole inorganic oxidant. In the context of the second alternative, the sulfur completely substitutes for the conventional oxidizing charge of the similar compounds of the prior art.

As to the sulfur content of the compounds of the invention (according to the first or second alternative above), it is generally between 5 and 60% by weight, advantageously between 20 and 45% by weight. A person skilled in the art will know how to optimize this sulfur content in order to:
maximize the capture of the decomposition products of said at least one inorganic borohydride;
while
preserving an "adequate" combustion temperature: sufficiently high to ensure proper combustion of the product but compatible with the application concerned;
minimizing the production of $H_2S$ (poison for a fuel cell); and
limiting the loss of hydrogen produced, "in a context in which sulfur substitutes for a hydrogenated oxidant".

It may be observed here incidentally that the sulfur, whereof the involvement, according to the invention, is mainly analyzed as a partial or total substitution of at least one inorganic oxidant, may also act as a partial substitute for at least one inorganic borohydride, to preserve a moderate combustion temperature.

With reference to the composition of the compounds of the invention, it can be stated that said at least one inorganic borohydride and said at least one inorganic oxidant (comprising sulfur, or even consisting of sulfur) generally account for at least 96% by weight of the total weight of said compounds (or even at least 98% by weight or even 100% by weight).

The optional difference from 100% generally consists of additives, such as auxiliaries for the process, for stability, for desensitization to static electricity (like $SiO_2$) and/or ballistic, combustion modifiers . . . .

It may be observed that characteristically, the compounds of the invention do not contain an organic binder in their composition.

It may also be stated that the composition of the compounds of the invention generally includes:
40 to 80% by weight of at least one inorganic borohydride selected from alkali borohydrides, alkaline-earth borohydrides and mixtures thereof (generally one such inorganic borohydride), and
20 to 60% by weight of at least one inorganic oxidant (generally one such inorganic oxidant and sulfur or simply sulfur);
and advantageously includes:
55 to 75% by weight of at least one inorganic borohydride selected from alkali borohydrides, alkaline-earth borohydrides and mixtures thereof (generally one such inorganic borohydride), and
25 to 45% by weight of at least one inorganic oxidant (generally one such inorganic oxidant and sulfur or simply sulfur);

As to the components of the compounds of the invention, apart from sulfur, they are components of prior art compounds of the inorganic borohydride and inorganic oxidant type.

Said at least one inorganic borohydride is therefore selected from alkali borohydrides (particularly of sodium, lithium), alkaline-earth borohydrides (particularly of magnesium) and mixtures thereof. Advantageously, a single borohydride of this type is used. Preferably, said at least one inorganic borohydride is selected from sodium, lithium or magnesium borohydride. The compounds of the invention very advantageously include $NaBH_4$, $LiBH_4$ or $Mg(BH_4)_2$.

Said at least one inorganic oxidant is therefore sulfur or a mixture of sulfur and at least one other inorganic oxidant, generally like those used in the composition of the compounds of the prior art, such as:
an ammonium salt, advantageously ammonium perchlorate,
a dinitramine, advantageously ammonium dinitramine; or
a nitrate, advantageously strontium nitrate.

The compounds of the invention very advantageously include $NH_4ClO_4$, $NH_4N(NO_2)_2$ or $Sr(NO_3)_2$.

In the context of advantageous alternatives, the compounds of the invention essentially include (for at least 96% of their weight, see above):

$NaBH_4+S+Sr(NO_3)_2$, or $NaBH_4+S+NH_4ClO_4$, or $NaBH_4+S+NH_4N(NO_2)_2$, or $Mg(BH_4)+S$.

The solid compounds of the invention are advantageously compacted materials having a given geometric shape. Preferably, they are in the form of granules, pellets or blocks. Said granules, pellets or blocks have any shape, for example spherical, ovoid or cylindrical. The granules generally weigh a few milligrams, the pellets generally weigh a few tenths of grams to a few grams, and the blocks generally weigh a few tens of grams to a few hundred grams.

The methods for obtaining these solid compounds are methods similar to those of the prior art, described in particular in the patent applications identified in the introduction herein.

A person skilled in the art is perfectly familiar with such methods for obtaining solid compounds (from powders), and in this case the solid compounds of the invention, whereof the composition characteristically includes sulfur.

The invention further relates to a method for generating hydrogen, by (self-sustaining) combustion of at least one solid compound. Said combustion method, known per se, is characteristically implemented with at least one compound of the invention, as described above (compound whereof the composition includes at least one inorganic borohydride, selected from alkali borohydrides, alkaline-earth borohydrides and mixtures thereof, and at least one inorganic oxidant and comprises sulfur).

Said method, known per se, generally comprises the following steps:
a solid uniform, powdery or granular composition is first prepared, comprising said at least one borohydride and said at least one oxidant;

this composition is then aggregated by appropriate means, for example those mentioned above, in order to form a compound in the form of a compact material, then the compact material is placed in a combustion chamber which is purged under inert gas or under vacuum. When the headspace is small (volume remaining in the chamber after placement of the compact material), such a purge may be useless in practice;

the combustion of the compact material is then initiated using an appropriate heat source, thereby causing the self-sustaining combustion of the material with hydrogen generation until combustion is complete. The appropriate heat sources allowing the initiation of combustion by "Joule" effect are well known to a person skilled in the art, particularly electrical initiators. The use of a nickel-chromium ignition filament placed in contact or coated with the compound to be initiated, to which a sufficient voltage and current (hence sufficient power) are applied, is perfectly suitable. For a given voltage, it is possible for example to increase the current until combustion is initiated. In certain cases, to promote the ignition, a conventional relay ignition powder, well known to a person skilled in the art, can be used between the filament and the compact material.

The method of the invention—method for generating hydrogen by combustion of solid compounds described above—is advantageously implemented to supply hydrogen to a fuel cell with a proton exchange membrane. Such a cell, which is familiar to a person skilled in the art, comprises at least one electrochemical cell and one pyrotechnical hydrogen generator. In the context of the method of the invention, the operation of said generator is based on the combustion of solid compounds of the invention.

The method of the invention can be analyzed perfectly in terms of the use of the compounds of the invention.

The present invention also relates to mixtures of powders (at least one inorganic borohydride, selected from alkali borohydrides, alkaline-earth borohydrides and mixtures thereof in powder state, sulfur in powder state and optionally at least one other inorganic oxidant in powder state), precursors of the compounds of the invention.

EXAMPLE 1

Solid Compounds Consisting of a Mixture of $NaBH_4$, $Sr(NO_3)_2$ and S

Thermodynamic calculations were carried out to demonstrate the advantage of adding sulfur to the compounds of the prior art $NaBH_4/Sr(NO_3)_2$ in order to decrease the residual Na content after combustion. They are listed in Table 2.

TABLE 2

| | Prior Art | Compounds according to the invention Weight percentage | | | | |
|---|---|---|---|---|---|---|
| $NaBH_4$ | 60.0 | 60.0 | 60.0 | 60.0 | 60.0 | 60.0 |
| S | 0.0 | 10.0 | 12.5 | 20.0 | 25.0 | 30.0 |
| $Sr(NO_3)_2$ | 40.0 | 30.0 | 27.5 | 20.0 | 15.0 | 10.0 |
| Combustion Temperature (K) at a pressure of 0.1 MPa | | | | | | |
| | 820.0 | 853.0 | 859.0 | 878.0 | 937.0 | 839.0 |
| Products after combustion present in a content above 1% | | | | | | |
| Nature | | | | | | |
| $H_2$ (g) | 6.4 | 6.4 | 6.4 | 6.4 | 6.4 | 6.2 |
| $H_2S$ (g) | | | | | | 2.7 |

TABLE 2-continued

| | Prior Art | Compounds according to the invention Weight percentage | | | | |
|---|---|---|---|---|---|---|
| Na (g) | | 1.6 | 1.8 | 2.4 | 1.0 | |
| $NaBO_2$ (g) | | 0.9 | 1.1 | 1.8 | 1.4 | |
| B (s) | 6.3 | 9.0 | 9.7 | 11.8 | 13.0 | 13.9 |
| BN (s) | 9.4 | 7.0 | 6.5 | 4.7 | 3.5 | 2.3 |
| $B_2O_3$ (l) | 21.7 | 15.8 | 14.3 | 9.7 | 7.7 | 6.6 |
| Na (l) | 35.3 | 19.9 | 16.0 | 4.2 | | |
| $Na_2S$ (g) | | 24.3 | 30.4 | 48.7 | 59.3 | 61.9 |
| SrO (s) | 19.6 | 14.7 | 13.5 | 9.8 | 5.2 | |
| SrS (s) | | | | | 2.4 | 5.7 |

The liquid sodium content produced after combustion of the prior art compound $NaBH_4/Sr(NO_2)_3$ (without sulfur additive) is 35.3%.

When the sulfur content is increased to replace $Sr(NO_3)_2$, the sodium metal content in the combustion products decreases. On the other hand, the quantity of $Na_2S$ increases.

The replacement of 25% $Sr(NO_3)_2$ by sulfur leads to a sodium gas content of about 1%. The sodium is mainly found in $Na_2S$ form. The hydrogen content is unchanged. The combustion temperature remains below 1000 K.

Above a sulfur content of 25% replacing $Sr(NO_3)_2$, the Na content produced is less than 1% but this is accompanied by the formation of $H_2S$, which is a poison for the cell, in a non-negligible proportion. This $H_2S$ produced in the generator must therefore be trapped before it enters into contact with the fuel cell.

EXAMPLE 2

Solid Compounds Consisting of a Mixture of $NaBH_4$, $NH_4ClO_4$ and S

Thermodynamic calculations were carried out to demonstrate the advantage of adding sulfur to the prior compounds $NaBH_4/NH_4ClO_4$ in order to decrease the residual Na content after combustion. They are listed in Table 3.

TABLE 3

| | Prior Art | Compounds according to the invention Weight percentage | | | |
|---|---|---|---|---|---|
| $NaBH_4$ | 60 | 60 | 60 | 60 | 60 |
| S | 0 | 20 | 25 | 30 | 35 |
| $NH_4ClO_4$ | 40 | 20 | 15 | 10 | 5 |
| Combustion Temperature (K) at a pressure of 0.1 MPa | | | | | |
| T (K) | 1183 | 1290 | 1238 | 987 | 682 |
| Products after combustion present in a content above 1% | | | | | |
| Nature | | | | | |
| HBS (g) | | | 1.910 | 3.797 | 0.245 |
| $H_2$ (g) | 7.8 | 7.1 | 6.8 | 6.4 | 5.9 |
| $H_2S$ (g) | | | | 3.4 | 10.7 |
| Na (g) | 12.4 | | | | |
| $NaBO_2$ (g) | 44.7 | 9.0 | | | |
| NaCl (g) | 0.72 | 2.4 | 1.1 | | |
| $Na_2Cl_2$ (g) | | 1.6 | | | |
| B (s) | 6.1 | 10.9 | 11.6 | 12.8 | 15.4 |
| BN (s) | 8.4 | 4.2 | 3.2 | 2.1 | 1.0 |
| $B_2O_3$ (l) | | 9.3 | 11.6 | 7.8 | 3.9 |
| NaCl (l) | 18.6 | 5.9 | 5.5 | | |
| NaCl (s) | | | | 5.0 | 2.5 |
| $Na_2S$ (g) | | 48.6 | 56.8 | 58.6 | 60.2 |

The sodium content produced after combustion of the prior art compound $NaBH_4/NH_4ClO_4$ (without sulfur additive) is 12.4%. Part of the sodium is found in the form of NaCl or NaBO$_2$. It is inadvisable to increase the ammonium perchlorate content because this decreases the hydrogen content and increases the combustion temperature above the acceptable limits for the application.

The replacement of half of the ammonium perchlorate by sulfur leads to a sodium content below 1%. The hydrogen content is only reduced from 7.8 to 7.1.

Above a sulfur content of 25% replacing NH$_4$ClO$_4$, the Na content produced is less than 1% but this is accompanied by the formation of H$_2$S, which is a poison for the cell, in a non-negligible proportion. This H$_2$S produced in the generator must therefore be trapped before it enters into contact with the fuel cell.

EXAMPLE 3

Solid Compounds Consisting of a Mixture of NaBH$_4$, NH$_4$N(NO$_2$)$_2$ and S

Thermodynamic calculations were carried out to demonstrate the advantage of adding sulfur to the prior compounds NaBH$_4$/NH$_4$(NO$_3$)$_2$ in order to decrease the residual Na content after combustion. They are listed in Table 4.

TABLE 4

|  | Prior Art | Compounds according to the invention Weight percentage | |
|---|---|---|---|
| NaBH$_4$ | 70 | 65 | 65 |
| S | 0 | 25 | 30 |
| NH$_4$N(NO$_2$)$_2$ | 30 | 10 | 5 |
| Combustion Temperature (K) at a pressure of 0.1 MPa | | | |
| T(K) | 950 | 945 | 734 |
| Products after combustion present in a content above 1% | | | |
| Nature | | | |
| HBS (g) |  |  | 1.910 |
| H$_2$ (g) | 8.4 | 7.2 | 6.9 |
| H$_2$S (g) |  |  | 2.5 |
| Na (g) | 10.5 | 2.3 |  |
| Na$_2$ (g) | 2.8 |  |  |
| Na (l) | 23.7 |  |  |
| NaBO$_2$ (g) | 15.9 | 3.3 |  |
| B (s) | 3.4 | 12.9 | 15.6 |
| BN (s) | 24.0 | 8.0 | 4.00 |
| B$_2$O$_3$ (l) | 11.2 | 5.1 | 3.7 |
| Na$_2$S (g) |  | 60.8 | 67.0 |

The sodium content produced after combustion of the prior art compound NaBH$_4$/NH$_4$N(NO$_2$)$_2$ (without sulfur additive) is 37%.

The addition of 25% sulfur to replace part of the ammonium dinitramine and part of the alkali borohydride (in order to maintain the combustion temperature as close as possible to that of the prior art compound) gives rise to a sodium content of below 3%. The hydrogen content is reduced from 8.4 to 7.2.

Above a sulfur content of 25%, the Na content is lower than 1% but this is accompanied by the formation of H$_2$S, which is a poison for the cell, in a non-negligible proportion. This H$_2$S produced in the generator must therefore be trapped before it enters into contact with the fuel cell.

EXAMPLE 4

Solid Compounds Consisting of a Mixture of Mg(BH$_4$)$_2$ and S

Thermodynamic calculations were carried out to demonstrate the advantage of completely replacing the oxidant Sr(NO$_3$)$_2$ of the prior art compound Mg(BH$_4$)$_2$/Sr(NO$_3$)$_2$ by sulfur. They are listed in Table 5.

TABLE 5

|  | Prior art | Compound according to the invention |
|---|---|---|
| Mg(BH$_4$)$_2$ | 70 | 62.7 |
| Sr(NO3)2 | 30 |  |
| S |  | 37.3 |
| Combustion Temperature (K) at a pressure of 0.1 MPa | | |
| Tc(K) | 1071 | 1206 |
| Products after combustion present in a content above 1% | | |
| H$_2$ (g) | 10.4 | 9.4 |
| Mg (g) | 1.4 |  |
| B (s) | 25.0 | 25.1 |
| BN (s) | 7.0 |  |
| Mg (l) | 8.7 |  |
| MgO (s) | 29.1 |  |
| MgS (s) | — | 65.5 |
| SrO (s) | 13.2 |  |

The magnesium content produced after combustion of the prior art compound Mg(BH$_4$)$_2$/Sr(NO$_3$)$_2$ (without sulfur additive) is 10.1%.

In this case, the strong affinity of the element sulfur for magnesium serves to completely replace the prior art oxidant by sulfur without the production of H$_2$S.

The invention claimed is:

1. A solid composition suitable for generating hydrogen by combustion, comprising:
   at least one inorganic borohydride selected from the group consisting of an alkali borohydride, an alkaline-earth borohydride and mixtures thereof; and
   sulfur,
   wherein said composition comprises the at least one inorganic borohydride and sulfur in an amount of 100% by weight based on the total weight of the solid composition.

2. The composition according to claim 1, wherein the composition includes 5 to 60% by weight of sulfur based on the total weight of the solid composition.

3. The composition according to claim 1, wherein said alkali borohydride is sodium borohydride or lithium borohydride, and said alkaline-earth borohydride is magnesium borohydride.

4. The composition according to claim 1, wherein the composition is in the form of a granule, a pellet or a block.

5. A method for generating hydrogen, comprising: combusting at least one solid composition wherein said at least one solid composition includes a solid composition according to claim 1.

6. The method according to claim 5, further comprising supplying hydrogen generated by combusting the at least one solid composition to a fuel cell having a proton exchange membrane.

7. The composition according to claim 1, wherein the composition includes 20 to 45% by weight of sulfur.

8. The composition according to claim 1, wherein the composition includes 55 to 75% by weight of said at least one inorganic borohydride based on the total weight of the solid composition.

9. The composition according to claim 1, wherein the composition includes 40 to 80% by weight of said at least one inorganic borohydride based on the total weight of the solid composition.

10. A solid composition suitable for generating hydrogen by combustion, comprising:
at least one inorganic borohydride selected from the group consisting of an alkali borohydride, an alkaline-earth borohydride and a mixture thereof;
sulfur; and
at least one inorganic oxidant other than sulfur,
wherein said composition comprises the at least one inorganic borohydride, sulfur and the at least one inorganic oxidant other than sulfur in an amount of 100% by weight based on the total weight of the solid composition.

11. The composition according to claim 10, wherein the composition includes:
20 to 60% by weight of sulfur and said at least one inorganic oxidant other than sulfur based on the total weight of the solid composition.

12. The composition according to claim 10, wherein said at least one inorganic oxidant other than sulfur is at least one selected from the group consisting of ammonium salts, ammonium perchlorate, dinitramines, ammonium dinitramine, nitrates, and strontium nitrate.

13. A method for generating hydrogen, comprising: combusting at least one solid composition, wherein said at least one solid composition includes a solid composition according to claim 10.

14. The method according to claim 13, further comprising supplying hydrogen generated by combusting the at least one solid composition to a fuel cell having a proton exchange membrane.

15. The solid composition of claim 10, wherein the composition includes 25 to 45% by weight of sulfur and said at least one inorganic oxidant other than sulfur based on the total weight of the solid composition.

16. The composition according to claim 10, wherein said alkali borohydride is sodium borohydride or lithium borohydride and said alkaline-earth borohydride is magnesium borohydride.

17. The composition according to claim 10, wherein the composition includes 5 to 60% by weight of sulfur based on the total weight of the solid composition.

18. The composition according to claim 10, wherein the composition includes 20 to 45% by weight of sulfur based on the total weight of the solid composition.

19. The compound according to claim 10, wherein the composition is in the form of a granule, a pellet or a block.

20. The composition according to claim 10, wherein the composition includes 55 to 75% by weight of said at least one inorganic borohydride based on the total weight of the solid composition.

21. The composition according to claim 10, wherein the composition includes 40 to 80% by weight of said at least one inorganic borohydride based on the total weight of the solid composition.

* * * * *